(12) United States Patent
Yang et al.

(10) Patent No.: US 12,260,084 B2
(45) Date of Patent: *Mar. 25, 2025

(54) AUTOMATIC DATA SEPARATION AND PLACEMENT FOR COMPRESSED DATA IN A STORAGE DEVICE

(71) Applicant: Samsung Electronics Co., Ltd., Suwon-si (KR)

(72) Inventors: Jingpei Yang, San Jose, CA (US); Jing Yang, San Jose, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,474

(22) Filed: Aug. 29, 2022

(65) Prior Publication Data

US 2022/0413707 A1 Dec. 29, 2022

Related U.S. Application Data

(63) Continuation of application No. 17/120,098, filed on Dec. 11, 2020, now Pat. No. 11,429,279.

(60) Provisional application No. 63/079,462, filed on Sep. 16, 2020.

(51) Int. Cl.
*G06F 3/06* (2006.01)
*G06F 12/06* (2006.01)
*G06F 16/174* (2019.01)

(52) U.S. Cl.
CPC .......... *G06F 3/0608* (2013.01); *G06F 3/0635* (2013.01); *G06F 3/0655* (2013.01); *G06F 12/06* (2013.01); *G06F 16/1744* (2019.01)

(58) Field of Classification Search
CPC ........ G06F 3/061; G06F 12/06; G06F 3/0655; G06F 3/0635; G06F 16/1744
USPC ............................................. 711/154, 12.002
See application file for complete search history.

(56) References Cited

U.S. PATENT DOCUMENTS

| | | |
|---|---|---|
| 10,185,512 B2 | 1/2019 | Hashimoto et al. |
| 10,430,102 B2 | 10/2019 | Kaczmarczyk et al. |
| 10,509,600 B2 | 12/2019 | Schauer et al. |
| 10,572,153 B2 | 2/2020 | Singhai et al. |

(Continued)

OTHER PUBLICATIONS

Bhimani, Janki, et al., "Enhancing SSDs with Multi-Stream: What? Why? How?," 2017 IEEE 36th International Performance Computing and Communications Conference (IPCCC), San Diego, CA, 2017, pp. 1-2, doi: 10.1109/PCCC.2017.8280493.

(Continued)

*Primary Examiner* — Yaima Rigol
*Assistant Examiner* — Edward Waddy, Jr.
(74) *Attorney, Agent, or Firm* — Renaissance IP Law Group LLP

(57) ABSTRACT

A storage device is disclosed. The storage device may include storage for data. A host interface logic may receive a dataset and a logical address from a host. A stream assignment logic may assign a stream identifier (ID) to a compressed dataset based on a compression characteristic of the compressed dataset. The stream ID may be one of at least two stream IDs; the compressed dataset may be determined based on the dataset. A logical-to-physical translation layer may map the logical address to a physical address in the storage. A controller may store the compressed dataset at the physical address using the stream ID.

21 Claims, 10 Drawing Sheets

(56) References Cited

U.S. PATENT DOCUMENTS

| | | | |
|---|---|---|---|
| 10,754,574 B1* | 8/2020 | Jo | G06F 3/0613 |
| 2007/0172134 A1* | 7/2007 | Namera | H04N 1/413 |
| | | | 375/E7.184 |
| 2012/0159098 A1 | 6/2012 | Cheung et al. | |
| 2015/0178013 A1* | 6/2015 | Rostoker | G06F 3/0644 |
| | | | 711/115 |
| 2015/0242122 A1 | 8/2015 | Yeh et al. | |
| 2016/0283125 A1 | 9/2016 | Hashimoto et al. | |
| 2016/0313943 A1* | 10/2016 | Hashimoto | G06F 16/1847 |
| 2018/0373808 A1* | 12/2018 | Gopal | G06F 16/221 |
| 2019/0373283 A1 | 12/2019 | Lindberg et al. | |
| 2020/0159445 A1 | 5/2020 | Kachare et al. | |
| 2020/0162356 A1 | 5/2020 | Momchilov et al. | |
| 2020/0310694 A1 | 10/2020 | Gao et al. | |
| 2020/0344666 A1 | 10/2020 | Wang et al. | |
| 2020/0357483 A1* | 11/2020 | Roquet | G16H 50/30 |
| 2021/0114616 A1* | 4/2021 | Altman | H04W 76/15 |
| 2021/0133029 A1* | 5/2021 | Dong | G06F 11/1489 |

OTHER PUBLICATIONS

Notice of Allowance for U.S. Appl. No. 17/120,098, mailed Apr. 26, 2022.
Office Action for U.S. Appl. No. 17/120,098, mailed Sep. 28, 2021.
Yong, Hwanjin, et al., "vStream: Virtual Stream Management for Multi-streamed SSDs," 10th {USENIX} Workshop on Hot Topics in Storage and File Systems (HotStorage 18), 2018, 6 pages.

* cited by examiner

AUTOMATIC DATA SEPARATION AND PLACEMENT FOR COMPRESSED DATA IN A STORAGE DEVICE

RELATED APPLICATION DATA

This application is a continuation of U.S. patent application Ser. No. 17/120,098, filed Dec. 11, 2020, now allowed, which claims the benefit of U.S. Provisional Patent Application Ser. No. 63/079,462, filed Sep. 16, 2020, which is incorporated by reference herein for all purposes.

FIELD

The inventive concepts relate generally to storage devices, and more particularly to organizing data stored on storage devices based on compression information.

BACKGROUND

Compressing data for storage on a storage device increases the amount of data that may be stored on the storage device. For example, if 1 terabyte (TB) of data is compressed by 50%, the data requires only 500 gigabytes (GB) to store the data. But compressing data may introduce other complexities, such as the need to compress and decompress the data, which operations are typically performed by the host processor. Further, when using storage devices, such as Solid State Drives (SSD) that use block-based storage, uncompressed data that might fill a block might leave a portion of the block unfilled once compressed. As a result, space on the storage device may be used inefficiently; or, if two or more sections of compressed data are stored in a single block, and particularly if a single compressed data crosses a block boundary, the write amplification factor may be increased.

A need remains to manage storage of compressed data on a storage device.

DETAILED DESCRIPTION

Figure 1:
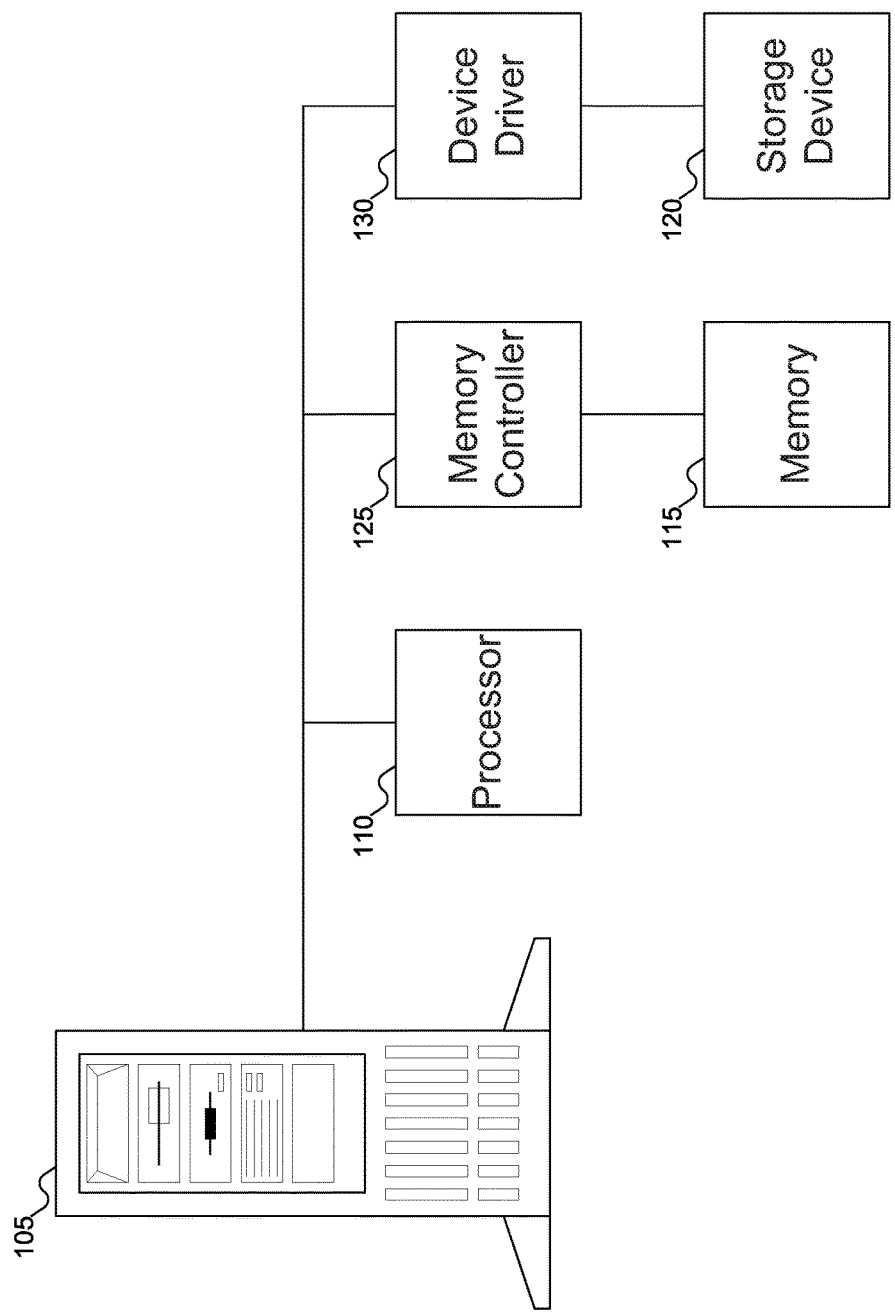
FIG. 1 shows a system including a Solid State Drive (SSD) that may perform streaming based on compression characteristics, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Compression technology has been widely used to reduce the amount of data transferred between system layers and save the limited on disk space for the ever-growing big data. Many technologies focus on compressing data on the host side—in the application or file system layer with fast and efficient encoding/decoding algorithms. Compressing data on Solid State Drives (SSDs) provides benefits, such as reducing host-side central processing unit (CPU) and memory consumptions, transparency to applications, and reducing the amount of data written. Compressing data on the SSD may also leverage different device features to further improve the performance. But different data may have different compression ratios: for example, a particular compression algorithm might compress one data by, say, 75%, but not compress another data at all. (These values are merely exemplary, and in theory any compression algorithm might be able to compress a particular data virtually up to 100%. These values are not intended to recite or suggest a limit beyond which a compression algorithm may not go.) That a compression algorithm may compress different data by different compression ratios introduces challenges to design efficient data mapping and placement mechanisms to store compressed data on a storage device.

Increased the Complexity of Flash Translation Layer (FTL) Design

In some embodiments of the inventive concept, the disclosed systems may map logical page addresses (LPAs) (or logical block addresses (LBAs)) of incoming data to physical page addresses (PPAs) (or physical block addresses (PBAs)) of a Not-AND (NAND) flash before writing the data to the storage device. Since the incoming data and the data as stored on the PPA may be the same size (when the SSD does not introduce its own compression), a single LPA may be associated with a single PPA, and an FTL may maintain a one-to-one address mapping table for uncompressed data. But if the SSD adds its own compression, the data length as stored on the SSD may vary from the data length as sent by the host.

Compressed data may be stored consecutively, and may be aligned to a physical page boundary if there is not enough space left in a partially-filled block. But either way, the complexity of the FTL may be increased: more than one logical page may be mapped to the same physical page, and additional information may be used to map PPA entries. Other solutions to storing compressed data may exist: for example, data may be stored continuously, even if a logical page of data might span two physical pages in the SSD.

High Write Amplification Due to Several Compressed Data Pages Being Stored in the Same Physical Page In SSDs, data is written to the SSD sequentially after compression. Each physical page (flash page) may contains several compressed pages. Since the flash page is the basic program unit, the whole physical page may be invalided if one of the compressed page in it is to updated. Other compressed pages stored in that physical page may also written back to flash, even without being modified. This extra write increases the write amplification of the SSD. The situation may be worsened when the original data stream stores data from different workloads with varying access intervals, since different data may be updated or invalidated according to different schedules.

To address these challenges, stream ID assignment may use information related to data compression in assigning data to streams on the storage device. The incoming request data may first be compressed in the device layer before sending the data to the FTL. After the data is compressed, the stream assignment module may assign each data block to a stream ID based on various policies. For example, when compression ratio is used for stream assignment, since different datasets have different compression ratios, the stream assignment module may direct requests to different data streams based on their compression ratio. Therefore, data requests from the same dataset may be assigned to the same steam.

Other methods may be used to assign stream ID after data is compressed depending on workloads, performance requirements, device interface, compression algorithms, etc., or a combined factors as mentioned. For example:

1) When multiple compression algorithms are supported on a single device, the compression algorithm may also be used as a factor in stream ID assignment.
2) When multiple interfaces are supported on a single device, data compressed by a block unit may be assigned to one stream ID, while data compressed by an object or key-value unit may be assigned to another stream ID.
3) Data with a compression speed below 200 megabytes per second (MB/sec) could be assigned to one stream ID and data with a compression speed at or above 200 MB/sec could be assigned another stream ID. Alternatively, data with a decompression speed below 200 MB/sec could be assigned to one stream ID and data with a decompression speed at or above 200 MB/sec could be assigned another stream ID, to achieve different performance requirements. These use cases could also be combined, resulting in four possible cases (and four possible stream assignments), depending on the compression speed and the decompression speed: both below 20 MB/sec, both above 200 MB/sec, and one each above and below 200 MB/sec. This concept may be generalized further with other threshold compression and/or decompression speed (for example, using thresholds of 200 MB/sec and 500 MB/sec), increasing the number of streams to which data may be assigned.
4) A threshold may also be used based on the compression ratio to assign data to stream IDs. For example, incompressible data may be assigned to stream ID 1, data with a compression ratio less than 2.0 may be assigned to stream ID 2, and data with a compression ratio greater than 2.0 may be assigned to stream ID 3.
5) Data address-based grouping, such as contiguous LBA ranges, lexicographically closer key names, data from the same object, or other host provided hints may also be used for the final stream assignment decision.

The data placement and mapping described above is not limited to multi-stream SSDs, and may be used with any devices having more than one physical or logical partitions, such as Non-Volatile Memory Express (NVMe)-zoned namespaces (ZNS).

The device interface is not limited to conventional fixed-sized blocks, and may be used with new interfaces such as Key-Value SSDs. On-device data compression could be of a key-value pair or object, with similar use of compression information for the stream ID assignment.

The grouping is not limited to devices performing in-device compression, and may be used with external host-based compression and Field Programmable Gate Array (FPGA)- and/or Application Specific Integrated Circuit (ASIC)-based compression stream assignment as well, if the streams accept variable length data.

FIG. 1 shows a system including a Solid State Drive (SSD) that may perform streaming based on compression characteristics, according to an embodiment of the inventive concept. In FIG. 1, machine 105 may include processor 110, memory 115, and storage device 120. Processor 110 may be any variety of processor. (Processor 110, along with the other components discussed below, are shown outside the machine for ease of illustration: embodiments of the inventive concept may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests to read data from or write data to either memory 115 or storage device 120. Storage device 120 may be used, for example, to store initial parameters (or ranges of values for initial parameters, along with what types of behaviors the ranges of values represent) used to initialize the simulation. Storage device 120 may be accessed using device driver 130. While FIG. 1 uses the generic term "storage device", embodiments of the inventive concept may include any storage device formats that may benefit from streaming of data using compression characteristics, examples of which may include hard disk drives and SSDs. Any reference to "SSD" below should be understood to include such other embodiments of the inventive concept.

Figure 2:
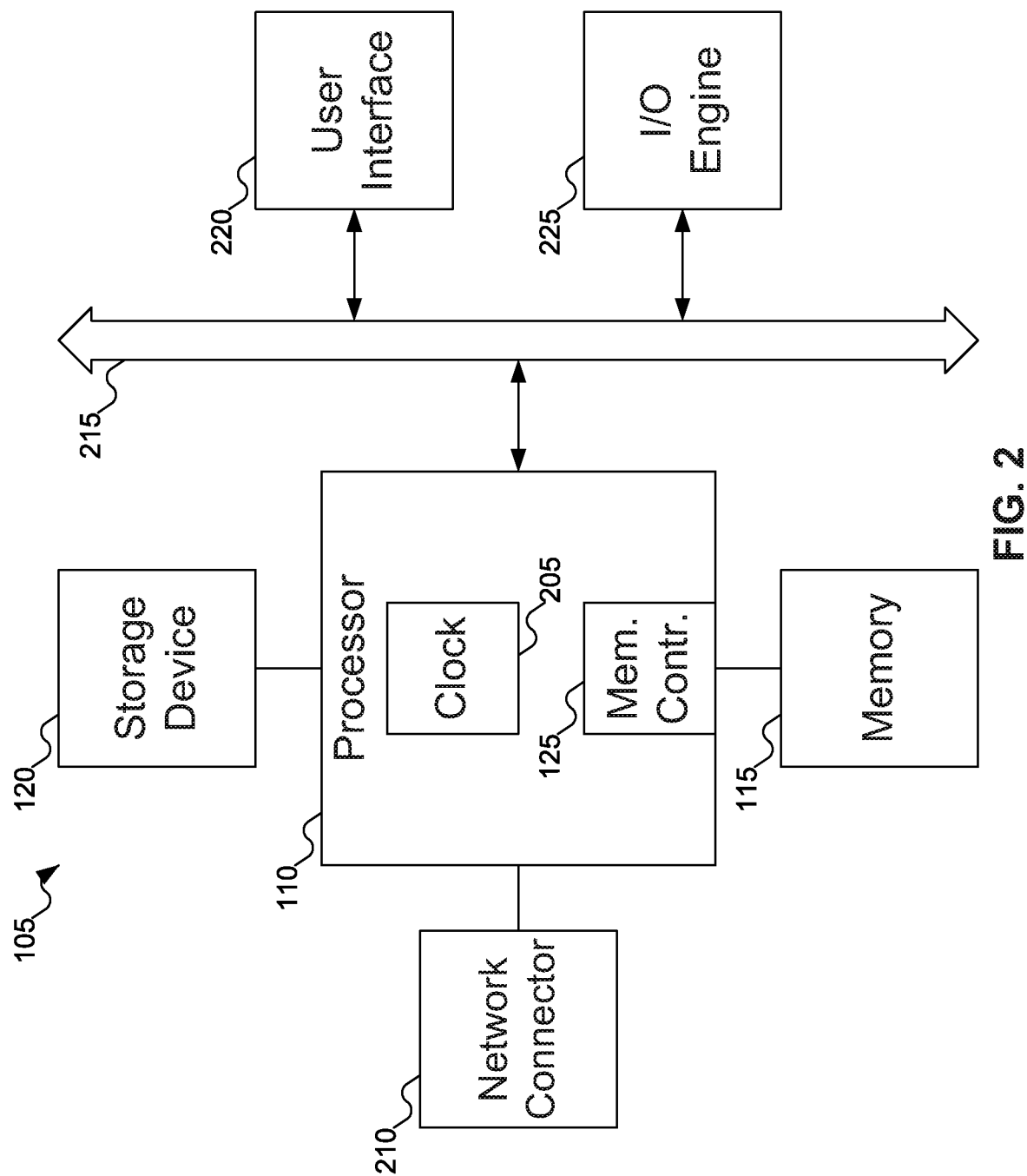
FIG. 2 shows details of the system of FIG. 1, according to embodiments of the inventive concept.

FIG. 2 shows details of the system of FIG. 1, according to embodiments of the inventive concept. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output interface ports that may be managed using Input/Output engines 225, among other components.

Figure 3:
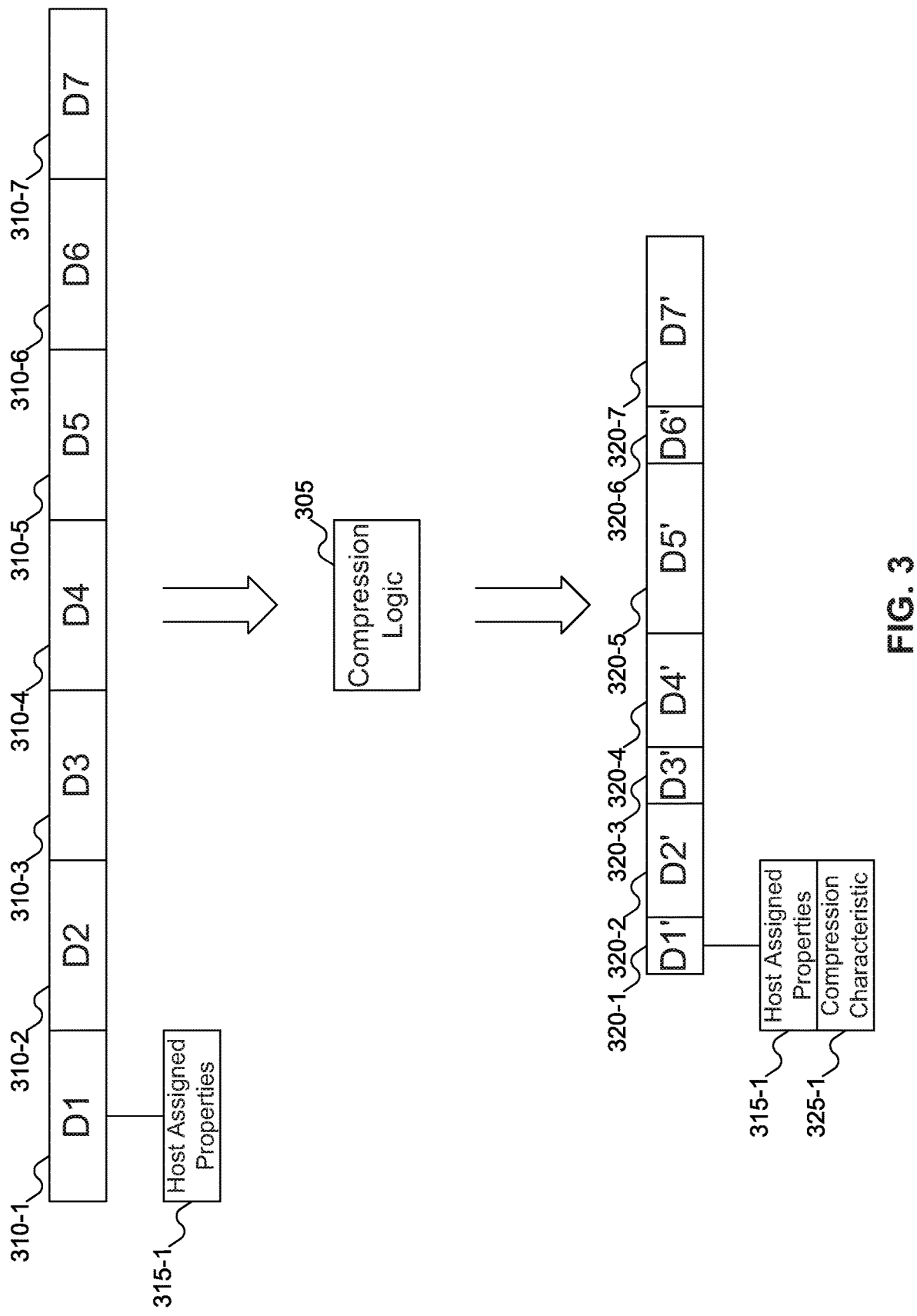
FIG. 3 shows a compression logic of the SSD of FIG. 1 compressing datasets, according to embodiments of the inventive concept.

FIG. 3 shows a compression logic of SSD 120 of FIG. 1 compressing datasets, according to embodiments of the inventive concept. In FIG. 3, compression logic 305 is shown receiving datasets 310-1 through 310-7 (datasets 310-1 through 310-7 may be thought of as "data"). For purposes of discussion, datasets 310-1 through 310-7 may be understood to be received in the order presented from left to right, with dataset 310-1 received by SSD 120 of FIG. 1 first, and dataset 310-7 received by SSD 120 of FIG. 1 last; in general, datasets may be received in any order. Each dataset 310-1 through 310-7 may be thought of as some chunk of data to be stored. For example, if SSD 120 of FIG. 1 is a block-based storage device, each dataset may be a block to be written to SSD 120 of FIG. 1; if SSD 120 of FIG. 1 is replaced with a storage device that receives data in some other manner—for example, as a value in a key-value pair (also called an "object") as may be used by a key-value storage device—datasets 310-1 through 310-7 may be of any permitted key-value pair size. In FIG. 3, datasets 310-1 through 310-7 are shown as all having the same size, but embodiments of the inventive concept may include datasets 310-1 through 310-7 with varying sizes.

In the discussion above and that follows, the focus is on datasets that would fit into a single block. The size of the block may vary depending the storage device: for example, a block could be approximately 1 megabyte (MB) in size. But while the term "block" is used, embodiments of the inventive concept may extend to storage units of other sizes, such as the page or superblock, with a benefit of embodiments of the inventive concept being the ability to store more data in a single chunk (be it a page, a block, or a superblock) than might normally be written to such a unit of storage.

Datasets 310-1 through 310-7 may also include other host assigned properties. Specifically, machine 105 of FIG. 1 may provide a logical address, such as a logical block address (LBA) or a key, that is paired with datasets: host assigned properties 315-1 are shown as paired with dataset 310-1, and datasets 310-2 through 310-7 may also be paired with other host assigned properties (not shown in FIG. 3). Host assigned properties 315-1 may also include other data associated with dataset 310-1. For example, machine 105 of FIG. 1 may assign a stream identifier to dataset 310-1, which may be included as part of host assigned properties 315-1. Host assigned properties 315-1 may also include other information provided by machine 105 of FIG. 1, and also indirect information provided by machine 105 of FIG. 1 (for example, the choice of interface offered by storage device 120 of FIG. 1 used by machine 105 of FIG. 1).

Assuming that datasets 310-1 through 310-7 are not compressed (how embodiments of the inventive concept may operate when datasets 310-1 through 310-7 are compressed is discussed further with reference to FIG. 8 below), compression logic 305 may compress (uncompressed) datasets 310-1 through 310-7 into compressed datasets 320-1 through 320-7. By compressing (uncompressed) datasets 310-1 through 310-7 into compressed datasets 320-1 through 320-7, the amount of storage required for compressed datasets 320-1 through 320-7 may be less than for (uncompressed) datasets 310-1 through 310-7. As a result, SSD 120 of FIG. 1 may be able to store more compressed data than it could store uncompressed data, increasing the functionality of the storage device.

Note that while (uncompressed) datasets 310-1 through 310-7 were presented as identical in size (although, as noted above, embodiments of the inventive concept may include datasets 310-1 through 310-7 of varying sizes), compressed datasets 320-1 through 320-7 may be of varying size. For example, compressed datasets 320-1, 320-3, and 320-6 may be 25% of the size of (uncompressed) datasets 310-1, 310-3, and 310-6, compressed datasets 320-2 and 320-4 may be 50% of the size of (uncompressed) datasets 310-2 and 310-4, and compressed datasets 320-5 and 320-7 may be 75% of the size of (uncompressed) datasets 320-5 and 320-7.

Compressed datasets 320-1 through 320-7 may be of varying sizes for any number of reasons. Compression logic 305 may apply different compression algorithms to different (uncompressed) datasets, which may produce different output sizes. Or, different (uncompressed) datasets might be different types of data, which may be more or less compressible. For example, video data is generally compressed, and compression logic 305 might not be able to significantly reduce the space required to store video data; on the other hand, documents tend to be fairly compressible, and compression logic might be able to significantly reduce the space required to store documents.

It is also possible that some of compressed datasets 320-1 through 320-7 might be identical to (uncompressed) datasets 310-1 through 310-7. For example, if some of datasets 310-1 through 310-7 are already compressed, further compression might not be possible, even after trying multiple compression algorithms. (In fact, it is possible for an output of compression logic 305 to be larger than the corresponding input: for example, if the input dataset is already highly compressed.) In such situations, compression logic 305 may simply leave such datasets alone without compressing them. To determine whether to compress datasets 310-1 through 310-7 using compression logic 305, machine 105 of FIG. 1 may provide compression logic 305 a hint whether compression logic 305 should try to compress datasets 310-1 through 310-7. Alternatively, compression logic 305 may start compression by default and stop the compression process if the first several chunks of a dataset prove incompressible (or minimally compressible).

Upon compressing datasets 310-1 through 310-7, compression logic 305 may add compression characteristic 325-1 to compressed dataset 320-1 (compressed datasets 320-2 through 320-7 may also be paired with other compression characteristics not shown in FIG. 3). Compression characteristic may represent any information relevant to how compression logic 305 may compress (uncompressed) dataset 310-1 into compressed dataset 320-1. Examples of compression characteristics that may be paired with compressed dataset 320-1 may include the reduction in storage space (which may be determined as the difference in size between (uncompressed) dataset 310-1 and compressed dataset 320-1), compression ratio (which may be determined as the ratio of the reduction in storage space and the size of (uncompressed) dataset 310-1), the compression speed (which may be determined as the amount of time needed to compress (uncompressed) dataset 310-1 into compressed dataset 320-1), the decompression speed (which may be determined as the amount of time needed to recover (uncompressed) dataset 310-1 from compressed dataset 320-1), the compression algorithm used to compress (uncompressed) dataset 310-1 into compressed dataset 320-1, a parameter, such as chunk size, used by a compression algorithm to compress (uncompressed) dataset 310-1 into compressed dataset 320-1, the original size of (uncompressed) dataset 310-1, or the interface across which (uncompressed) dataset 310-1 was received from machine 105 of FIG. 1. As an example of the latter, if SSD 120 of FIG. 1 includes multiple interfaces, such as a block-based interface and a key-value interface, the interface across which (uncompressed) dataset 310-1 was received from machine 105 may be part of compression characteristic 325-1. Although FIG. 3 uses the singular form "characteristic", embodiments of the inventive concept may include more than one compression characteristic in compression characteristic 325-1.

Compression logic 305 may be implemented in any desired manner. Compression logic 305 may be implemented using a special purpose circuit, such as a Field Programmable Gate Array (FPGA), an Application-Specific Integrated Circuit (ASIC), or appropriate software running on a central processing unit (CPU), a graphics processing unit (GPU), a general purpose GPU (GPGPU), or some other processor of SSD 120 of FIG. 1, among other possibilities. Such software may be stored in any desired manner within SSD 120 of FIG. 1: for example, in a ROM or some variant thereof, or in other storage of SSD 120 of FIG. 1, which may be part of the general storage used for compressed datasets 320-1 through 320-7 or reserved storage.

Figure 4:
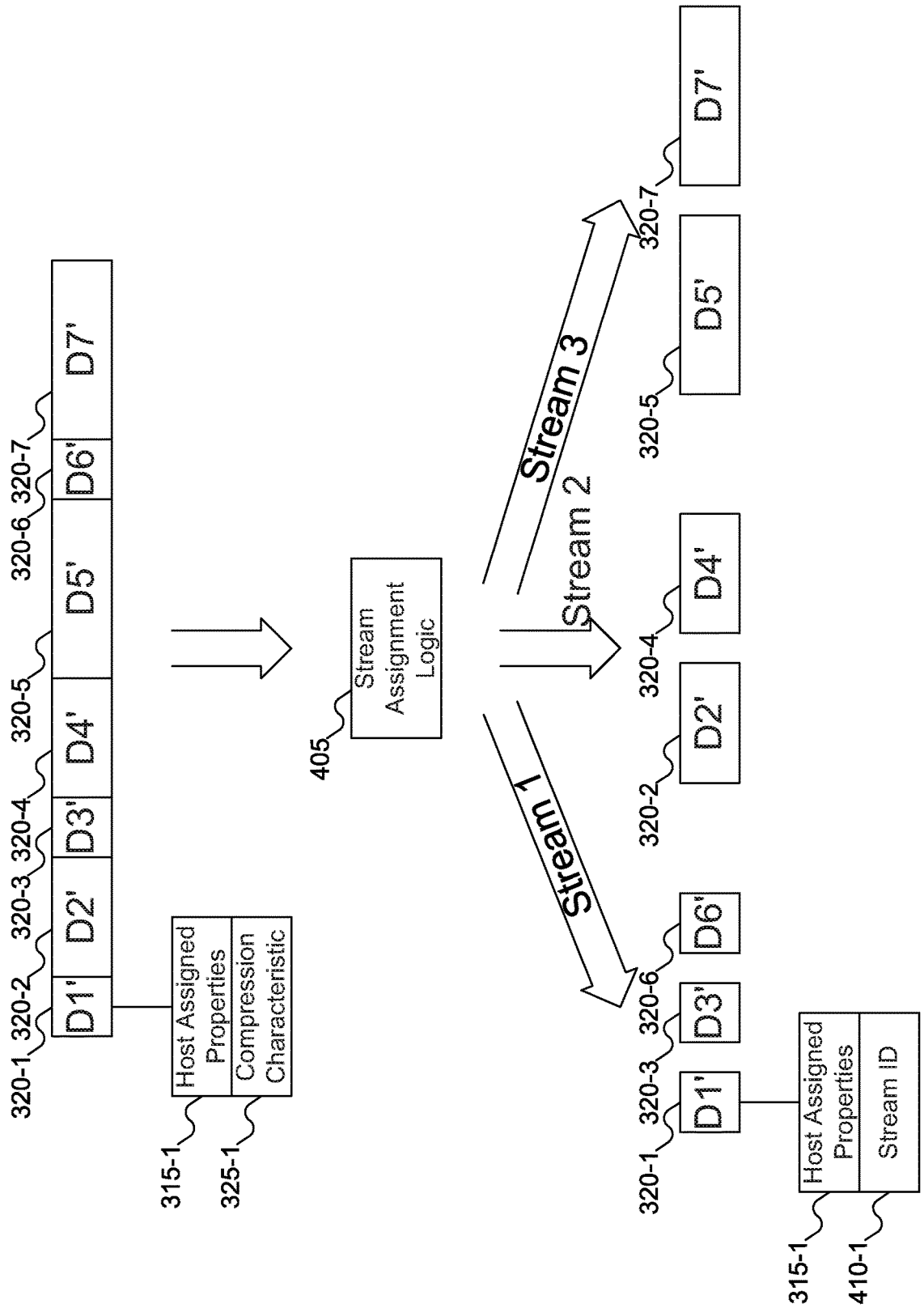
FIG. 4 shows a stream assignment logic of the SSD of FIG. 1 assigning the compressed datasets of FIG. 3 to streams using compression characteristics, according to embodiments of the inventive concept.

FIG. 4 shows a stream assignment logic of SSD 120 of FIG. 1 assigning compressed datasets 320-1 through 320-7 of FIG. 3 to streams using compression characteristics, according to embodiments of the inventive concept. In FIG. 4, stream assignment logic 405 may receive compressed datasets 320-1 through 320-7, and may use the paired compression characteristic to determine to which stream the corresponding compressed dataset may be assigned. For example, if stream assignment logic 405 uses the compression ratio as a compression characteristic, then datasets that are compressed by 75% or more—such as compressed datasets 320-1, 320-3, and 320-6—may be assigned to one stream, datasets compressed by 50% or more up to 75%—such as compressed datasets 320-2 and 320-4—may be assigned to a second stream, datasets compressed by 25% or more up to 50%—such as datasets 320-5 and 320-7—may be assigned to a third stream, and datasets compressed by less than 25% (none of compressed datasets 320-1 through 320-7 meet this criteria) may be assigned to a fourth stream.

The expectation is that data that is compressed comparably may be expected to stay on SSD 120 of FIG. 1 for roughly the same amount of time. Therefore, by grouping together datasets that are comparably compressed, it is expected that all such datasets may be invalidated at the same time. If true, then when a block that had stored such compressed datasets is selected for garbage collection, there might be no valid data in the block requiring programming, which may reduce the write amplification factor.

While the above discussion focuses on compression ratio as the compressed characteristic used by stream assignment logic 405, the same principles apply when other compression characteristics are used. In addition, stream assignment logic 405 may use more than one compression characteristic. For example, the compression ratio may be combined with the compression algorithm to provide a finer level of control regarding which compressed datasets are assigned to which stream IDs. Further, more than two such compression characteristics may be combined.

In addition, stream assignment logic 405 may also factor in information received from machine 105 of FIG. 1, as may be found in host assigned properties 315-1. For example, machine 105 of FIG. 1 may assign (uncompressed) dataset 310-1 to a particular stream ID. Stream assignment logic 405 may then use this information in combination with one or more compression characteristics in assigning data. Thus, for example, the compression ratio may be used as described above, but with the host-assigned stream ID used to further divide the data shown as assigned to into multiple "substreams": streams 1-4 might be used for compressed datasets assigned by the host to stream ID 1, streams 5-8 might be used for compressed datasets assigned by the host to stream ID 2, and so on.

Stream assignment logic 405 may be implemented in any desired manner. Stream assignment logic 405 may be implemented using a special purpose circuit, such as an FPGA, an ASIC, or appropriate software running on a CPU, a GPU, a GPGPU, or some other processor of SSD 120 of FIG. 1, among other possibilities. Such software may be stored in any desired manner within SSD 120 of FIG. 1: for example, in a ROM or some variant thereof, or in other storage of SSD 120 of FIG. 1, which may be part of the general storage used for compressed datasets 320-1 through 320-7 or reserved storage. Such software may be stored with, or separately from, the software for compression logic 305 of FIG. 3.

Figure 5:
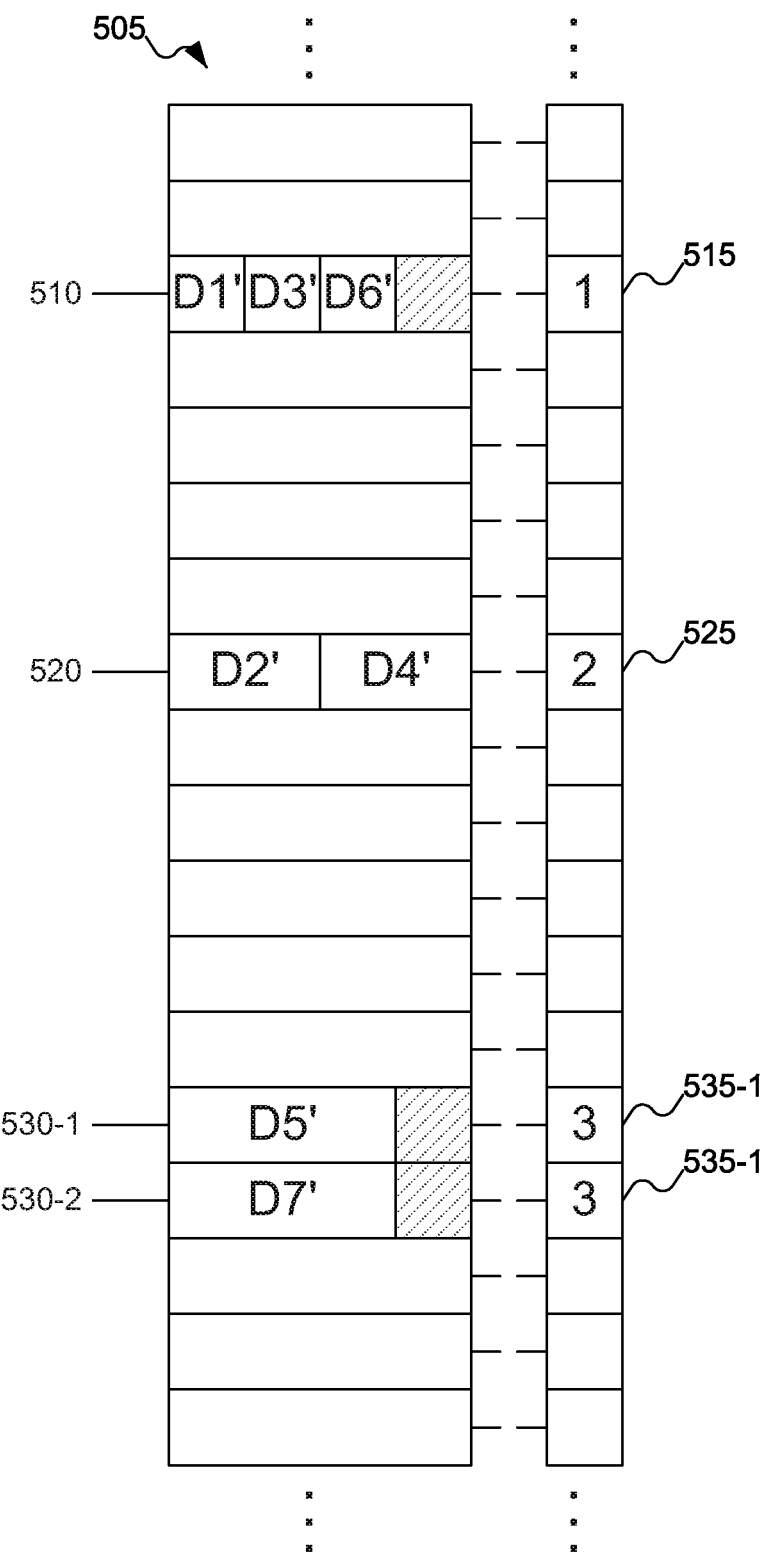
FIG. 5 shows the compressed datasets of FIG. 4 stored in blocks using the streams assigned by the stream assignment logic of FIG. 4, according to some embodiments of the inventive concept.

FIG. 5 shows compressed datasets 320-1 through 320-7 of FIG. 4 stored in blocks using the streams assigned by stream assignment logic 405 of FIG. 4, according to some embodiments of the inventive concept. In FIG. 5, blocks 505 may be blocks in SSD 120. Because compressed datasets 320-1, 320-3, and 320-6 of FIG. 4 are all assigned to stream ID 1, these compressed datasets may be stored in block 510, which may be assigned to stream ID 1 as shown by stream ID 515. Similarly, compressed datasets 320-2 and 320-4 of FIG. 4 may be stored in block 520, which may be assigned to stream ID 2 as shown by stream ID 525. Finally, compressed datasets 320-5 and 320-7 of FIG. 4 may be stored in blocks 530-1 and 530-2, which may be assigned to stream ID 3 as shown by stream IDs 535-1 and 535-2.

Note that blocks 510, 530-1, and 530-2 are only partially filled: the crosshatching may show unused space in these blocks. (For comparison, block 520 is shown as full, the fullness of the remaining blocks shown in FIG. 5 is not relevant.) These unused spaces may be used later when additional compressed data assigned to those streams arrives, if such compressed data might fit in the unused space. Otherwise, if additional compressed data assigned to those streams arrives but would not fit in the unused space in the blocks, new blocks may be assigned to the streams and the additional compressed data stored in those newly assigned blocks.

Figure 6:
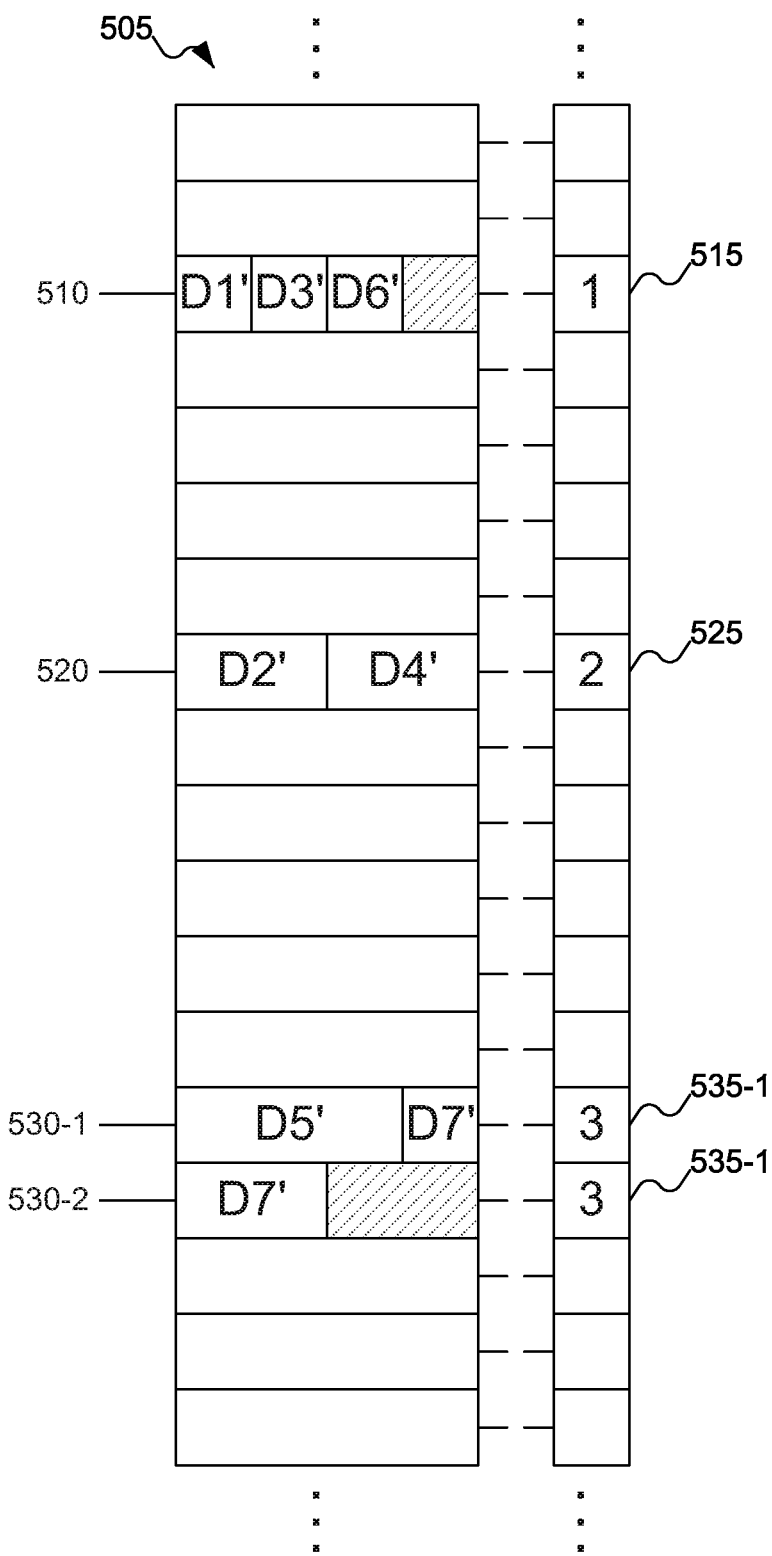
FIG. 6 shows the compressed datasets of FIG. 4 stored in blocks using the streams assigned by the stream assignment logic of FIG. 4, according to other embodiments of the inventive concept.

In FIG. 5, assuming that no compressed dataset is larger than a block size, it is desired that any individual compressed dataset be stored in exactly one block. Put another way, it is desired that no dataset span multiple blocks, if possible. This choice explains why dataset 320-7 of FIG. 6 is stored entirely in block 530-2, when dataset 320-7 of FIG. 6 could have been stored partly in block 530-1 and partly in block 530-2. If a compressed dataset is split across multiple blocks, that fact increases the number of blocks that, if subject to garbage collection, may affect the write amplification factor for a single compressed dataset. By keeping a single compressed dataset entirely within a single block, the write amplification factor may be reduced. But in some embodiments of the inventive concept, it may be desirable for each block to be filled completely before a new block is assigned to a stream. FIG. 6 illustrates how the storage in SSD 120 of FIG. 1 may be used in such embodiments of the inventive concept.

The storage of compressed datasets 320-1 through 320-7 of FIG. 4 in FIG. 6 is almost identical to that of FIG. 5. The difference is that compressed dataset 320-7 of FIG. 4 may be split across blocks 530-1 and 530-2. By having compressed datasets 320-5 and 330-5 of FIG. 4 stored contiguously (that is, next to each other with no space, or as little space as possible, between then), each block is used to maximum storage efficiency. But because compressed dataset 320-7 of FIG. 4 may now be split across blocks 530-1 and 530-2 (or put another way, compressed dataset 320-7 of FIG. 4 may cross the block boundary between blocks 530-1 and 530-2), the flash translation table of SSD 120 of FIG. 1 may need to reflect that compressed dataset 320-7 is actually stored in two different blocks. Since SSD 120 of FIG. 1 may move data from one block to another without concern for adjacent or contiguous data, SSD 120 of FIG. 1 may end up separating the two parts of compressed dataset 320-7 of FIG. 4, and the flash translation table may reflect more than one physical address where compressed dataset 320-7 of FIG. 4 is stored. (During programming of valid data found in a block selected for garbage collection, compressed dataset 320-7 of FIG. 4 might be further fragmented, leading to three or more different physical blocks where compressed dataset 320-7 of FIG. 4 may be found.)

Figure 7:
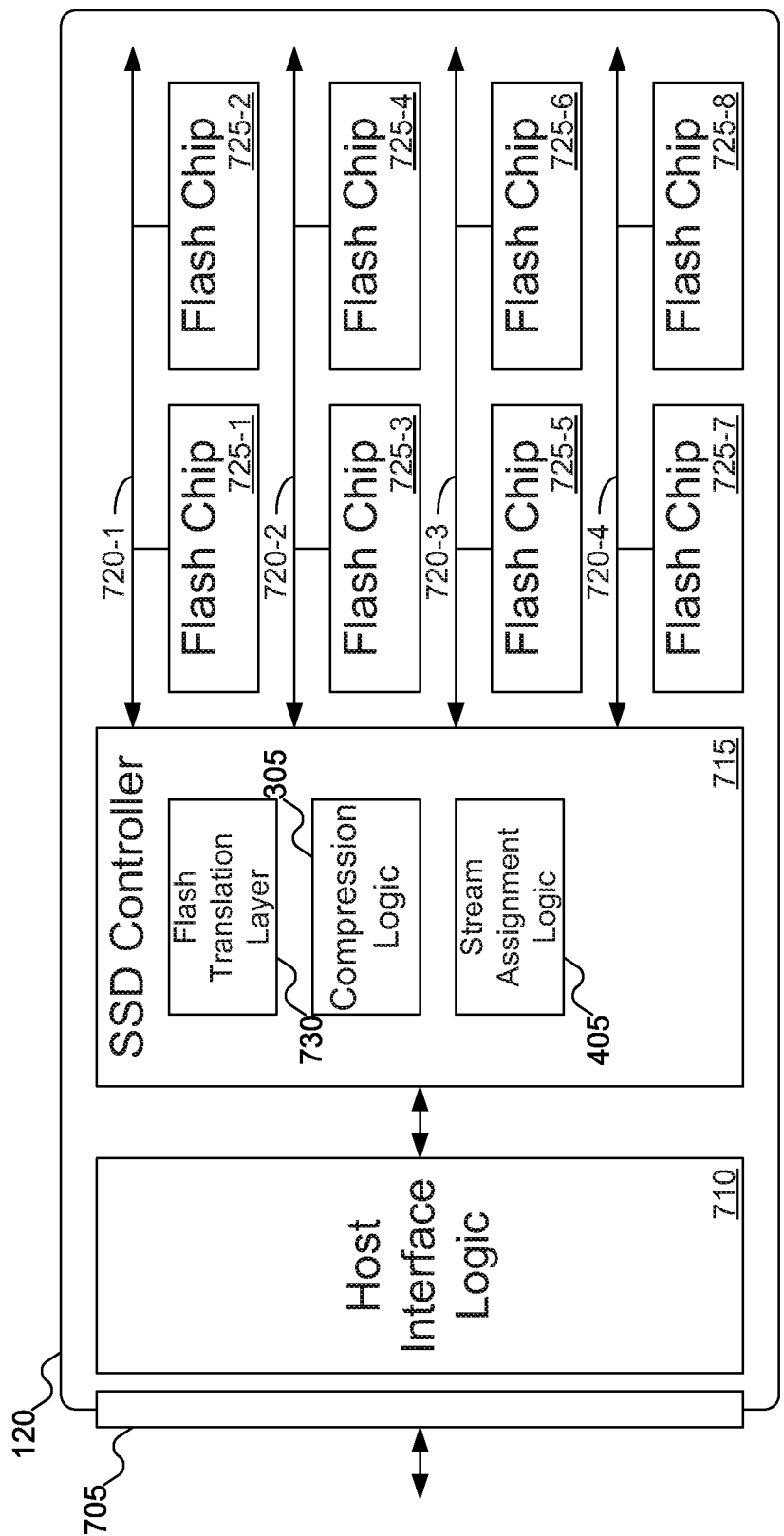
FIG. 7 shows details of the SSD of FIG. 1, according to embodiments of the inventive concept.

FIG. 7 shows details of SSD 120 of FIG. 1, according to embodiments of the inventive concept. In FIG. 7, SSD 120 may include interface 705. Interface 705 may be an interface used to connect SSD 120 to machine 105 of FIG. 1. SSD 120 may include more than one interface 705: for example, one interface might be used for block-based read and write requests, and another interface might be used for key-value read and write requests. While FIG. 7 suggests that interface 705 is a physical connection between SSD 120 and machine 105 of FIG. 1, interface 705 may also represent protocol differences that may be used across a common physical interface. For example, SSD 120 might be connected to machine 105 using a U.2 or an M.2 connector, but may support block-based requests and key-value requests: handling the different types of requests may be performed by a different interface 705.

SSD 120 may also include host interface logic 710, which may manage interface 705. If SSD 120 includes more than one interface 705, a single host interface logic 710 might manage all interfaces, SSD 120 might include a host interface logic for each interface, or some combination thereof might be used.

SSD 120 may also include SSD controller 715, various channels 720-1, 720-2, 720-3, and 720-4, along which various flash memory chips 725-1, 725-2, 725-3, 725-4, 725-3, 725-6, 725-7, and 725-8 may be arrayed. SSD controller 715 may manage sending read requests and write requests to flash memory chips 725-1 through 725-8 along channels 720-1 through 320-4. Although FIG. 7 shows four channels and eight flash memory chips, a person skilled in the art will recognize that there may be any number of channels including any number of flash memory chips.

Within each flash memory chip, the space may be organized into blocks, such as those shown in FIGS. 5-6, which may be further subdivided into pages. The page is typically the smallest unit of data that may be read or written on an SSD. Page sizes may vary as desired: for example, a page may be 4 kilobyte (KB) of data. If less than a full page is to be written, the excess space is "unused".

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the inventive concept, the unit of erasure may differ from the block: for example, it may be a superblock, which may be a set of multiple blocks.)

SSD controller 715 may include flash translation layer 730 (which may be termed more generally a logical-to-physical translation layer, for storage devices that do not use flash storage), compression logic 305, and stream assignment logic 405. Flash translation layer 730 may handle translation of logical addresses (as used by processor 110 of FIG. 1) and physical addresses where data is stored in flash chips 725-1 through 725-8. The logical address may be an LBA, a key (as might be used in a key-value storage device), or any logical identifier that might be used by machine 105 of FIG. 1. Compression logic 305 and stream assignment logic 405 have been discussed above with reference to FIGS. 3-4.

As discussed above, dataset 310-1 of FIG. 3 may be compressed to produce compressed dataset 320-1 of FIG. 3, with associated compression characteristic 325-1 of FIG. 3.

Further, compressed dataset 320-1 of FIG. 4 may be assigned a stream ID by stream assignment logic 405 of FIG. 3, which in turn may affect the block into which compressed dataset 320-1 of FIG. 4 may be written. For example, turning back to FIGS. 5-6, if a new compressed dataset arrives that is assigned to stream ID 1, that compressed dataset might fit into block 510, whereas if the compressed dataset is assigned to stream 2 a new block may be used to store the compressed dataset.

Since the physical location where data is stored may depend on stream assignment logic 405, which in turn may depend on compression logic 305, flash translation layer 730 may need to know the stream to which dataset 310-1 of FIG. 3 before the mapping from the logical address to the physical address may be stored. This fact is why SSD controller 715 is shown as including compression logic 305 and stream assignment logic 405. But embodiments of the inventive concept may include compression logic 305 and/or stream assignment logic 405 in places other than SSD controller 715. For example, one or both of these elements may be included in host interface logic 710. Nor must compression logic 305 and stream assignment logic 405 be located in the same place: for example, compression logic 305 might be in host interface logic 710, and stream assignment logic 405 might be in SSD controller 715. Indeed, as discussed with reference to FIG. 8 below, one or both of compression logic 305 and stream assignment logic 405 might be external to SSD 120.

In addition, since a single block might store more than one compressed dataset (as shown in FIGS. 5-6), flash translation layer 730 may reflect this fact by mapping multiple LBAs to PBAs in a single block (or some other unit of storage). In theory, flash translation layer 730 may now store more LBA-to-PBA mappings than there are blocks in storage device 120.

Figure 8:
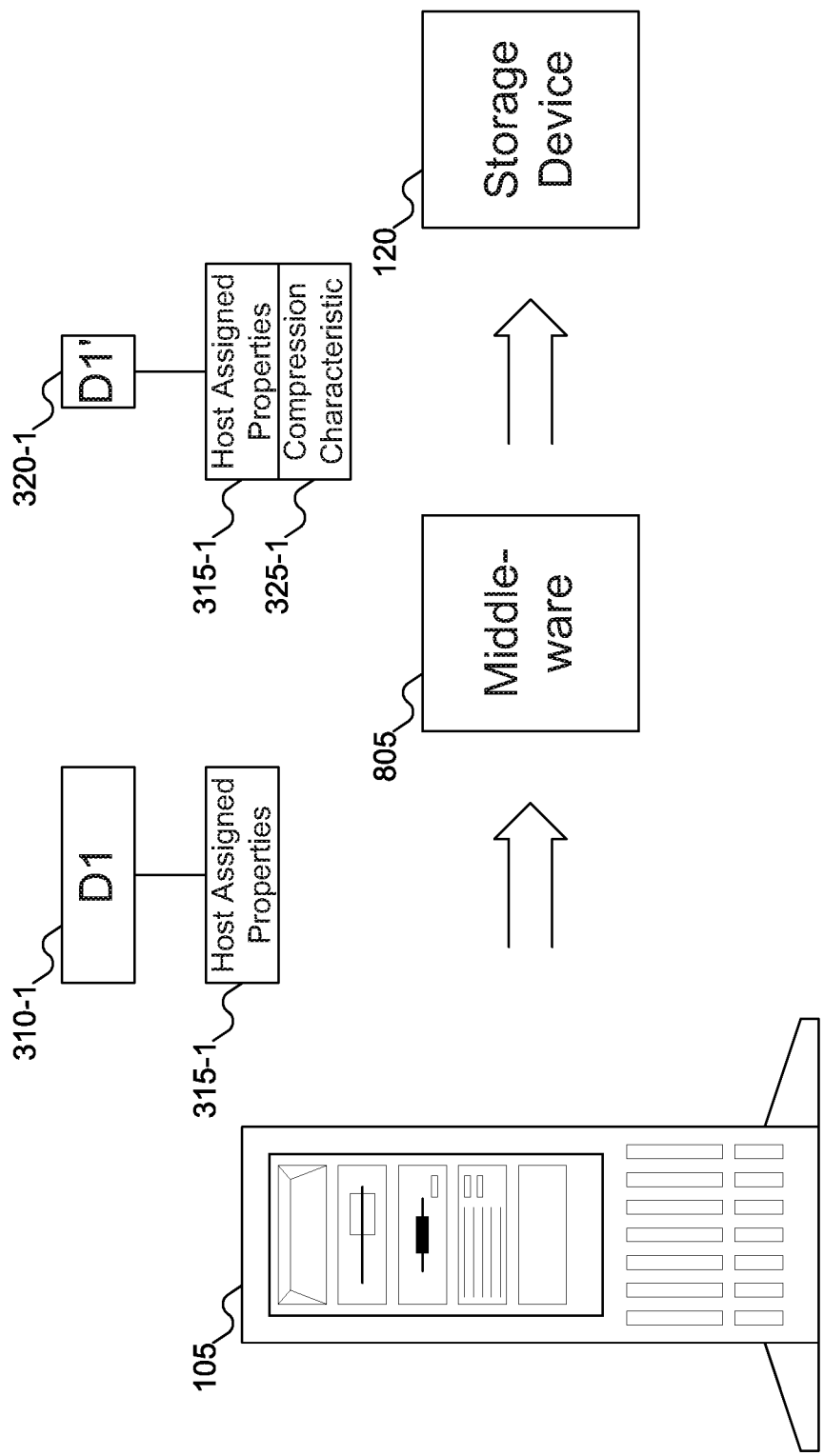
FIG. 8 shows middleware performing example operations for the compression of the datasets of FIG. 3, according to embodiments of the inventive concept.

FIG. 8 shows middleware performing example operations for the compression of the datasets of FIG. 3, according to embodiments of the inventive concept. In FIG. 8, machine 105 may send dataset 310-1 (and datasets 310-2 through 310-7 of FIG. 3, although not shown in FIG. 8), along with host assigned properties 315-1 to middleware 805. Middleware 805 may be software running on processor 110 of FIG. 1, or it may be additional hardware interposed between machine 105 and storage device 120. For example, middleware 805 may be an FPGA, an ASIC, or other hardware located somewhere between machine 105 and storage device 120. Middleware 805 also might not be a separate element as shown in FIG. 8: for example, machine 105 may perform the compression itself, rather than middleware 805 being a separate element to perform compression. Finally, while FIG. 8 shows middleware 805 as separate from storage device 120, middleware 805 may be included with storage device 120: for example, within the same enclosure as storage device 120.

Middleware 805 may include compression logic 305 of FIG. 3, and may perform the compression of (uncompressed) dataset 310-1 into compressed dataset 320-1. Middleware 805 may attach compression characteristic 325-1 to compressed dataset 320-1, to enable storage device 120 to assign compressed dataset 320-1 to a stream based on compression characteristic 325-1.

In embodiments of the inventive concept as shown in FIG. 8, storage device 120 may receive compressed data 320-1, rather than uncompressed data 310-1. But provided storage device 120 has access to compression characteristic 325-1, storage device 120 may perform stream assignment based on compression characteristic 325-1 even without performing compression internally to storage device 120.

In some embodiments of the inventive concept, middleware 805 (or machine 105) may also perform stream assignment. That is, middleware 805 (or machine 105) may also include stream assignment logic 405 of FIG. 4. In this manner, middleware 805 (or machine 105) may use compression characteristic 325-1 to assign a stream ID to compressed dataset 320-1. Storage device 120 may then use that stream ID to store compressed dataset 320-1 in an appropriate block in storage device 120.

While FIG. 8 shows host 105 or middleware 805 performing compression and providing storage device 120 with compression characteristic 325-1, in some embodiments of the inventive concept host 105 or middleware 805 may compress (uncompressed) dataset 310-1 into compressed dataset 320-1, but without providing compression characteristic 325-1 to storage device 120. In such embodiments of the inventive concept, storage device 120 may attempt to compress compressed dataset 320-1 to generate compression characteristic 325-1, even though the dataset received by storage device 120 is already compressed.

In other embodiments of the inventive concept, even though host 105 or middleware 805 may compress (uncompressed) dataset 310-1 into compressed dataset 320-1 and provide compression characteristic 325-1 to storage device 120, storage device 120 may attempt to further compress the received dataset. In such embodiments of the inventive concept, storage device 120 may combine the compression characteristic it generates with compression characteristic 325-1 as received from host 105 or middleware 805, and may use the combined compression characteristic to assign the further compressed dataset to a stream. How the compression characteristics may be combined may depend on the compression characteristics themselves. For example, compression ratios may be multiplied: if compression characteristic 325-1 reflects that the compressed dataset 320-1 has been compressed to half its original size, and storage device 120 is able to further reduce the space required by another two thirds, then the final compressed dataset is ⅙ the size of the (uncompressed) dataset 310-1. On the other hand, compression speeds or decompression speeds may by combined by summing the individual speeds. Other compression characteristics, such as compression algorithm or chunk size, may require representing two separate compression algorithms or chunk sizes used by the different compression attempts.

Thus, there are at least three use cases: 1) storage device 120 may receive (uncompressed) dataset 310-1 and compresses it into compressed dataset 320-1; 2) storage device 120 may receive compressed dataset 320-1 from host 105 and/or middleware 805 but does not attempt to compress compressed dataset 320-1 further; or 3) storage device 120 may receive compressed dataset 320-1 from host 105 and/or middleware 805 and may attempt to compress compressed dataset 320-1 further Regardless of which case occurs in practice (and it could be that all three use cases occur with storage device 120 at various times in its lifecycle), storage device 120 may receive a dataset and may store a dataset. These two datasets may the same, as in the second described use case, or they may be different, as in the other described used cases. But there may be a relationship between the dataset received by storage device 120 and the dataset stored by storage device 120, and it may be said that the dataset written to storage device 120 is determined based on the dataset received by storage device 120.

Figure 9:
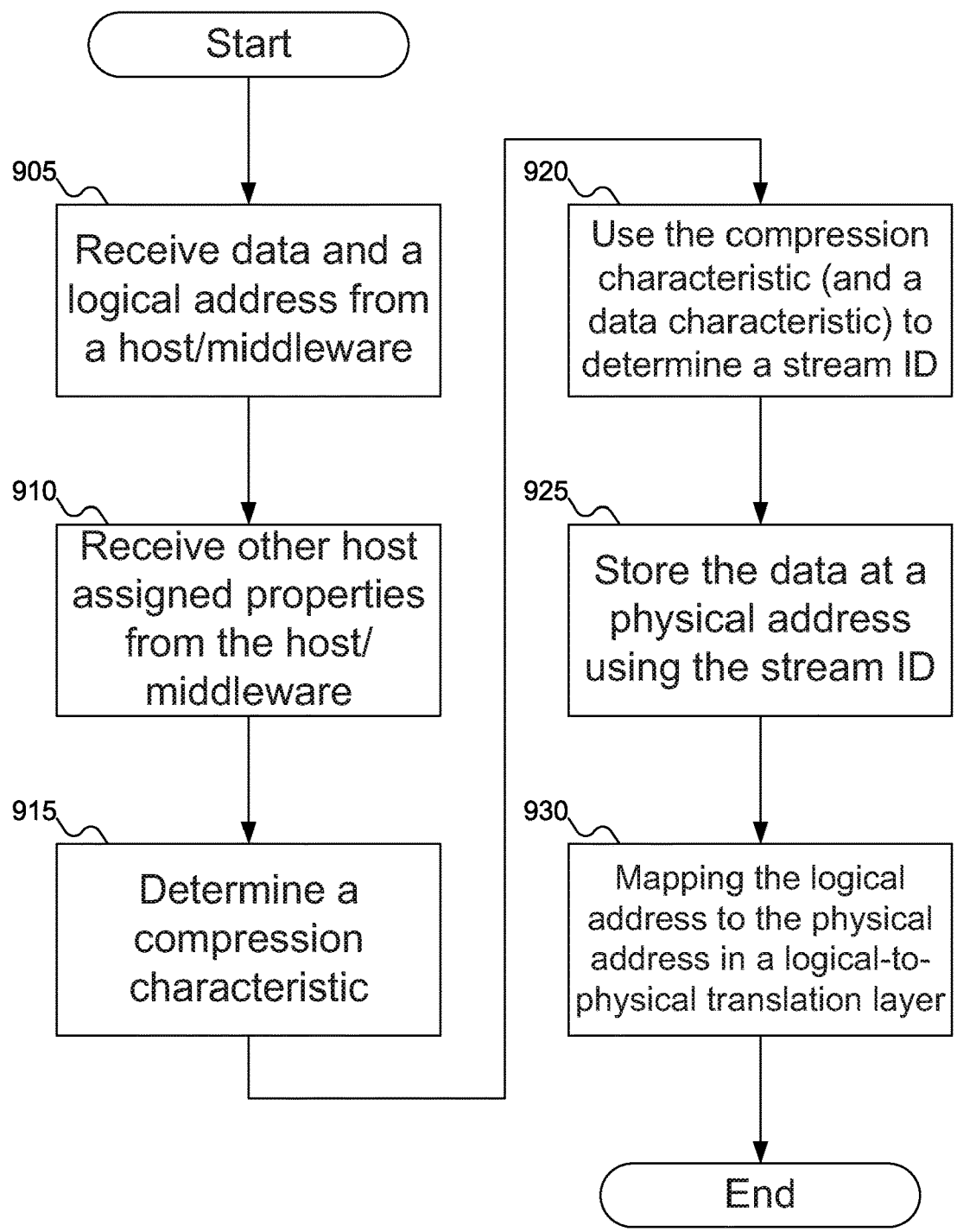
FIG. 9 shows a flowchart of an example procedure to assign compressed datasets to streams in the SSD of FIG. 1, according to embodiments of the inventive concept.

FIG. 9 shows a flowchart of an example procedure to assign compressed datasets to streams in storage device 120 of FIG. 1, according to embodiments of the inventive concept. In FIG. 9, at block 905, storage device 120 of FIG. 1 may receive data from machine 105 of FIG. 1 or middleware 805 of FIG. 8. As discussed above with reference to FIG. 8, this data may be uncompressed data, such as datasets 310-1 through 310-7 of FIG. 3, or compressed data, such as compressed dataset 320-1 of FIG. 8. At block 910, storage device 120 of FIG. 1 may receive host assigned properties 315-1 of FIG. 3 from machine 105 of FIG. 1 or middleware 805 of FIG. 8. At block 915, storage device 120 of FIG. 1 may determine compression characteristic 325-1 of FIG. 3. As discussed further with reference to FIG. 10 below, storage device 120 of FIG. 1 may receive compression characteristic 325-1 of FIG. 3 from machine 105 of FIG. 1 or middleware 805 of FIG. 8, or may calculate compression characteristic 325-1 when compressing (uncompressed) dataset 310-1 of FIG. 3 into compressed dataset 320-1 of FIG. 3. At block 920, stream assignment logic 405 of FIG. 3 may use compression characteristic 325-1 of FIG. 1 to assign compressed dataset 320-1 of FIG. 3 to a stream (and associate a stream ID with compressed dataset 320-1 of FIG. 3). At block 925, storage device 120 of FIG. 1 may store compressed dataset 320-1 of FIG. 3 in a block in storage device 120 of FIG. 1. Finally, at block 930, logical-to-physical translation layer 730 may be used to map a logical address for dataset 310-1 of FIG. 3 to the physical address where compressed dataset 320-1 of FIG. 1 is stored in storage device 120 of FIG. 1.

Figure 10:
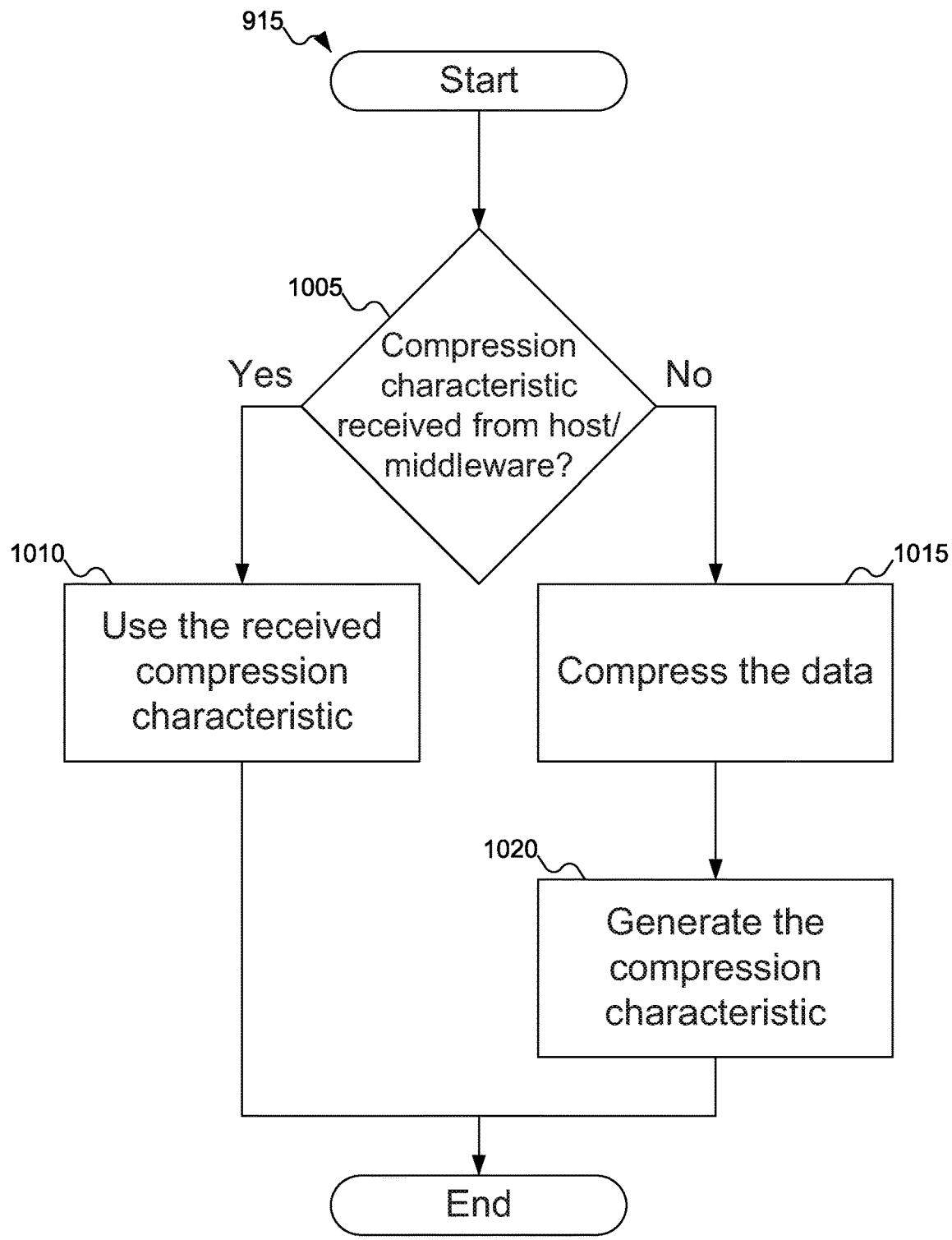
FIG. 10 shows a flowchart of an example procedure for determining the compression characteristics of the compressed datasets in the storage device of FIG. 1, according to embodiments of the inventive concept.

FIG. 10 shows a flowchart of an example procedure for determining the compression characteristics of compressed datasets 320-1 through 320-7 of FIG. 3 in storage device 120 of FIG. 1, according to embodiments of the inventive concept. In FIG. 10, at block 1005, storage device 120 may determine if compression characteristic 325-1 of FIG. 3 was received from machine 105 of FIG. 1 or middleware 805 of FIG. 8 (in other words, whether the data in question was compressed before the data was received at storage device 120 of FIG. 1). If so, then at block 1010, stream assignment logic 405 of FIG. 4 may use compression characteristic 325-1 of FIG. 3 as received from machine 105 of FIG. 1 or middleware 805 of FIG. 8. If not, then the data was not received compressed, so at block 1015, compression logic 305 of FIG. 3 may compress the data to produce compressed dataset 320-1 of FIG. 1, as a result of which compression logic 305 of FIG. 3 may generate (at block 1020) compression characteristic 325-1 of FIG. 3.

In FIGS. 9-10, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. First, by performing compression inside the storage device, the load on the host is reduced, as the host does not have to perform data compression. Second, by performing stream assignment using compression characteristics, data that is similarly compressed may be stored together within the storage device. Since such data is more likely to be invalidated at the same time, for storage devices such as SSDs garbage collection may be more efficient, and the write amplification factor may be reduced.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:
  storage for data;
  a host interface logic to receive a dataset and a logical address from a host;
  a stream assignment logic to assign a stream identifier (ID) to a compressed dataset based on a compression characteristic of the compressed dataset; and
  a logical-to-physical translation layer to map the logical address to a physical address in the storage;
  a controller to store the compressed dataset at the physical address using the stream ID,
  wherein the compressed dataset is determined based on the dataset, and
  wherein the stream ID is one of at least two stream IDs.

Statement 2. An embodiment of the inventive concept includes the storage device according to statement 1, wherein the storage device includes a Solid State Drive (SSD).

Statement 3. An embodiment of the inventive concept includes the storage device according to statement 1, wherein the dataset includes the compressed dataset.

Statement 4. An embodiment of the inventive concept includes the storage device according to statement 3, wherein the host interface logic is configured to further receive the compressed dataset from a middleware between the host and the storage device.

Statement 5. An embodiment of the inventive concept includes the storage device according to statement 4, wherein the host interface logic is configured to further receive the compression characteristic from the middleware.

Statement 6. An embodiment of the inventive concept includes the storage device according to statement 3, wherein the host interface logic is configured to further receive the compression characteristic from the host.

Statement 7. An embodiment of the inventive concept includes the storage device according to statement 1, wherein the host interface logic includes the stream assignment logic.

Statement 8. An embodiment of the inventive concept includes the storage device according to statement 1, wherein the logical-to-physical translation layer includes the stream assignment logic.

Statement 9. An embodiment of the inventive concept includes the storage device according to statement 1, further comprising compression logic to compress the dataset to generate the compressed dataset.

Statement 10. An embodiment of the inventive concept includes the storage device according to statement 9, wherein the compression logic is configured to generate the compression characteristic.

Statement 11. An embodiment of the inventive concept includes the storage device according to statement 9, wherein the host interface logic includes the compression logic.

Statement 12. An embodiment of the inventive concept includes the storage device according to statement 9, wherein the logical-to-physical translation layer includes the compression logic.

Statement 13. An embodiment of the inventive concept includes the storage device according to statement 1, wherein the compression characteristic is drawn from a set including a compression ratio, a compression speed, a decompression speed, and a compression algorithm.

Statement 14. An embodiment of the inventive concept includes the storage device according to statement 1, wherein the stream assignment logic is configured to assign the stream ID to the compressed dataset based on the compression characteristic of the compressed dataset and a host assigned property.

Statement 15. An embodiment of the inventive concept includes the storage device according to statement 14, wherein the host assigned property is drawn from a set including the logical address, a logical block address (LBA), a key, a host stream ID, and an interface between the host and the storage device in the host interface logic.

Statement 16. An embodiment of the inventive concept includes the storage device according to statement 1, wherein the compressed dataset is stored in a single block associated with the stream ID in the storage.

Statement 17. An embodiment of the inventive concept includes the storage device according to statement 16, wherein the single block includes a second compressed dataset.

Statement 18. An embodiment of the inventive concept includes the storage device according to statement 1, wherein the compressed dataset is stored contiguously with a second compressed dataset in a block associated with the stream ID in the storage.

Statement 19. An embodiment of the inventive concept includes the storage device according to statement 18, wherein the compressed dataset crosses a block boundary.

Statement 20. An embodiment of the inventive concept includes a method, comprising:

receiving a dataset at a storage device from a host;
determining a compression characteristic for a compressed dataset;
determining a stream identifier (ID) using the compression characteristic; and
storing the compressed dataset in a storage in the storage device using the stream ID,
wherein the compressed dataset is determined based on the dataset, and
wherein the stream ID is one of at least two stream IDs.

Statement 21. An embodiment of the inventive concept includes the method according to statement 20, wherein the storage device includes a Solid State Drive (SSD).

Statement 22. An embodiment of the inventive concept includes the method according to statement 20, wherein:
storing the compressed dataset in the storage in the storage device using the stream ID includes storing the compressed dataset at a physical address in the storage in the storage device using the stream ID; and
the method further comprises:
receiving a logical address for the dataset at the storage device from the host; and
mapping the logical address to the physical address in a logical-to-physical translation layer.

Statement 23. An embodiment of the inventive concept includes the method according to statement 20, wherein receiving the dataset at the storage device from the host includes receiving the compressed dataset at the storage device from the host.

Statement 24. An embodiment of the inventive concept includes the method according to statement 23, wherein receiving the compressed dataset from the host at the storage device includes receiving the compressed dataset at the storage device from a middleware between the host and the storage device.

Statement 25. An embodiment of the inventive concept includes the method according to statement 20, further comprising compressing the dataset to generate the compressed dataset.

Statement 26. An embodiment of the inventive concept includes the method according to statement 25, wherein compressing the dataset to generate the compressed dataset includes compressing the dataset to generate the compressed dataset after receiving the dataset at the storage device from the host and before storing the compressed dataset in a storage in the storage device using the stream ID.

Statement 27. An embodiment of the inventive concept includes the method according to statement 20, wherein compressing the dataset to generate the compressed dataset includes generating the compression characteristic.

Statement 28. An embodiment of the inventive concept includes the method according to statement 20, wherein the compression characteristic is drawn from a set including a compression ratio, a compression speed, a decompression speed, and a compression algorithm.

Statement 29. An embodiment of the inventive concept includes the method according to statement 20, wherein determining the stream ID using the compression characteristic includes determining the stream ID using the compression characteristic and a host assigned property.

Statement 30. An embodiment of the inventive concept includes the method according to statement 29, wherein the host assigned property is drawn from a set including the logical address, a logical block address (LBA), a key, a host stream ID, and an interface between the host and the storage device in the host interface logic.

Statement 31. An embodiment of the inventive concept includes the method according to statement 20, wherein storing the compressed dataset in the storage in the storage device using the stream ID includes storing the compressed dataset in a single block in the storage in the storage device, the single block associated with the stream ID.

Statement 32. An embodiment of the inventive concept includes the method according to statement 31, wherein the single block includes a second compressed dataset.

Statement 33. An embodiment of the inventive concept includes the method according to statement 20, wherein storing the compressed dataset in the storage in the storage device using the stream ID includes storing the compressed dataset contiguously with a second compressed dataset in a block in the storage in the storage device, the single block associated with the stream ID.

Statement 34. An embodiment of the inventive concept includes the method according to statement 33, wherein the compressed dataset crosses a block boundary.

Statement 35. An embodiment of the inventive concept includes an article, comprising a non-transitory storage medium, the non-transitory storage medium having stored thereon instructions that, when executed by a machine, result in:
receiving a dataset at a storage device from a host;
determining a compression characteristic for a compressed dataset;
determining a stream identifier (ID) using the compression characteristic; and
storing the compressed dataset in a storage in the storage device using the stream ID,
wherein the compressed dataset is determined based on the dataset, and
wherein the stream ID is one of at least two stream IDs.

Statement 36. An embodiment of the inventive concept includes the article according to statement 35, wherein the storage device includes a Solid State Drive (SSD).

Statement 37. An embodiment of the inventive concept includes the article according to statement 35, wherein:
storing the compressed dataset in the storage in the storage device using the stream ID includes storing the compressed dataset at a physical address in the storage in the storage device using the stream ID; and
the method further comprises:
receiving a logical address for the dataset at the storage device from the host; and
mapping the logical address to the physical address in a logical-to-physical translation layer.

Statement 38. An embodiment of the inventive concept includes the article according to statement 35, wherein receiving the dataset at the storage device from the host includes receiving the compressed dataset at the storage device from the host.

Statement 39. An embodiment of the inventive concept includes the article according to statement 38, wherein receiving the compressed dataset from the host at the storage device includes receiving the compressed dataset at the storage device from a middleware between the host and the storage device.

Statement 40. An embodiment of the inventive concept includes the article according to statement 35, the non-transitory storage medium having stored thereon further instructions that, when executed by the machine, result in compressing the dataset to generate the compressed dataset.

Statement 41. An embodiment of the inventive concept includes the article according to statement 40, wherein compressing the dataset to generate the compressed dataset includes compressing the dataset to generate the compressed dataset after receiving the dataset at the storage device from the host and before storing the compressed dataset in a storage in the storage device using the stream ID.

Statement 42. An embodiment of the inventive concept includes the article according to statement 35, wherein compressing the dataset to generate the compressed dataset includes generating the compression characteristic.

Statement 43. An embodiment of the inventive concept includes the article according to statement 35, wherein the compression characteristic is drawn from a set including a compression ratio, a compression speed, a decompression speed, and a compression algorithm.

Statement 44. An embodiment of the inventive concept includes the article according to statement 35, wherein determining the stream ID using the compression characteristic includes determining the stream ID using the compression characteristic and a host assigned property.

Statement 45. An embodiment of the inventive concept includes the article according to statement 44, wherein the host assigned property is drawn from a set including the logical address, a logical block address (LBA), a key, a host stream ID, and an interface between the host and the storage device in the host interface logic.

Statement 46. An embodiment of the inventive concept includes the article according to statement 35, wherein storing the compressed dataset in the storage in the storage device using the stream ID includes storing the compressed dataset in a single block in the storage in the storage device, the single block associated with the stream ID.

Statement 47. An embodiment of the inventive concept includes the article according to statement 46, wherein the single block includes a second compressed dataset.

Statement 48. An embodiment of the inventive concept includes the article according to statement 35, wherein storing the compressed dataset in the storage in the storage device using the stream ID includes storing the compressed dataset contiguously with a second compressed dataset in a block in the storage in the storage device, the single block associated with the stream ID.

Statement 49. An embodiment of the inventive concept includes the article according to statement 48, wherein the compressed dataset crosses a block boundary.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:
   storage for data;
   a first circuit to receive a dataset from a host; and
   a second circuit to assign an attribute to a transformed dataset based at least in part on a transformation characteristic of the transformed dataset;
   a controller to store the transformed dataset in the storage device based at least in part on the attribute,
   wherein the transformed dataset is determined based on the dataset, and
   wherein the storage device is configured to store the transformed dataset in a block in the storage based at least in part on the attribute.

2. The storage device according to claim 1, wherein the dataset includes the transformed dataset.

3. The storage device according to claim 2, wherein the first circuit is configured to further receive the transformation characteristic from the host.

4. The storage device according to claim 1, further comprising a third circuit to generate the transformed dataset from the dataset.

5. The storage device according to claim 4, wherein the third circuit is configured to generate the transformation characteristic.

6. The storage device according to claim 1, wherein the second circuit is configured to assign the attribute to the transformed dataset based at least in part on the transformation characteristic of the transformed dataset and a host assigned property, wherein the host assigned property is different from the transformation characteristic.

7. The storage device according to claim 6, wherein the host assigned property is drawn from a set including a logical address, a key, a host attribute, and an interface between the host and the storage device in the first circuit.

8. The storage device according to claim 1, wherein the transformed dataset is stored in a single block associated with the attribute in the storage.

9. The storage device according to claim 8, wherein the single block includes a second transformed dataset.

10. The storage device according to claim 1, wherein the attribute is one of at least two attributes.

11. The storage device according to claim 10, wherein the attribute includes a stream identifier (ID).

12. A method, comprising:
    receiving a dataset at a storage device from a host;
    determining a transformation characteristic for a transformed dataset; and
    determining an attribute on the storage device based at least in part on the transformation characteristic;
    storing the transformed dataset in a storage in the storage device based at least in part on the attribute,
    wherein the transformed dataset is associated with the dataset.

13. The method according to claim 12, wherein:
    storing the transformed dataset in the storage in the storage device based at least in part on the attribute includes storing the transformed dataset at a physical address in the storage in the storage device based at least in part on the attribute; and
    the method further comprises:
    receiving a logical address for the dataset at the storage device from the host; and
    mapping the logical address to the physical address in a circuit.

14. The method according to claim 12, wherein determining a transformation characteristic for a transformed dataset includes transforming the dataset to generate the transformed dataset.

15. The method according to claim 14, wherein transforming the dataset to generate the transformed dataset includes generating the transformation characteristic.

16. The method according to claim 12, wherein determining the attribute based at least in part on the transformation characteristic includes determining the attribute based at least in part on the transformation characteristic and a host assigned property, wherein the host assigned property is different from the transformation characteristic.

17. The method according to claim 16, wherein the host assigned property is drawn from a set including a logical address for the dataset, a key, a host attribute, and an interface between the host and the storage device.

18. The method according to claim 12, wherein storing the transformed dataset in the storage in the storage device based at least in part on the attribute includes storing the transformed dataset in a single block in the storage in the storage device, the single block associated with the attribute.

19. The method according to claim 12, wherein the attribute is one of at least two attributes.

20. An article, comprising a non-transitory storage medium, the non-transitory storage medium having stored thereon instructions that, when executed by a machine, result in:
- receiving a dataset at a storage device from a host;
- determining a transformation characteristic for a transformed dataset; and
- determining an attribute on the storage device based at least in part on the transformation characteristic; and
- storing the transformed dataset in a storage in the storage device based at least in part on the attribute,
- wherein the transformed dataset is associated with the dataset.

21. The article according to claim 20, wherein:
- storing the transformed dataset in the storage in the storage device based at least in part on the attribute includes storing the transformed dataset at a physical address in the storage in the storage device based at least in part on the attribute; and
- the method further comprises:
  - receiving a logical address for the dataset at the storage device from the host; and
  - mapping the logical address to the physical address in a circuit.

* * * * *